(12) United States Patent
Teufel et al.

(10) Patent No.: US 9,216,668 B2
(45) Date of Patent: Dec. 22, 2015

(54) FITTING FOR A VEHICLE SEAT AND VEHICLE SEAT

(71) Applicant: Johnson Controls Components GmbH & Co. KG, Kaiserslautern (DE)

(72) Inventors: Ingo Teufel, Rockenhausen (DE); Peter Reimer, Ramsen (DE); Uwe Assmann, Remscheid (DE); Christoph Peters, Wermelskirchen (DE)

(73) Assignee: Johnson Controls Components GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 14/374,353

(22) PCT Filed: May 17, 2013

(86) PCT No.: PCT/EP2013/060280
§ 371 (c)(1),
(2) Date: Jul. 24, 2014

(87) PCT Pub. No.: WO2013/174756
PCT Pub. Date: Nov. 28, 2013

(65) Prior Publication Data
US 2015/0015044 A1 Jan. 15, 2015

(30) Foreign Application Priority Data
May 22, 2012 (DE) .......... 10 2012 010 402

(51) Int. Cl.
*B60N 2/235* (2006.01)
*B60N 2/02* (2006.01)
*B60N 2/20* (2006.01)
*B60N 2/44* (2006.01)

(52) U.S. Cl.
CPC ............ *B60N 2/2356* (2013.01); *B60N 2/0224* (2013.01); *B60N 2/20* (2013.01); *B60N 2002/445* (2013.01); *B60N 2002/446* (2013.01); *B60N 2002/4455* (2013.01)

(58) Field of Classification Search
CPC .... B60N 2/2213; B60N 2/235; B60N 2/2356; B60N 2/2358; B60N 2/0224; B60N 2/20; B60N 2002/445; B60N 2002/446; B60N 2002/4455
See application file for complete search history.

(56) References Cited

U.S. PATENT DOCUMENTS

| 5,788,325 | A | * | 8/1998 | Ganot | ................. B60N 2/433 297/216.14 |
| 6,561,584 | B1 | * | 5/2003 | Schwarz | ............... B60N 2/433 297/367 R |

(Continued)

FOREIGN PATENT DOCUMENTS

| DE | 10 2005 046 807 B3 | 11/2006 |
| DE | 10 2005 031 918 A1 | 1/2007 |
| DE | 10 2006 015 560 B3 | 8/2007 |
| DE | 10 2008 047 901 A1 | 5/2009 |
| DE | 10 2010 025 112 A1 | 12/2011 |
| DE | 10 2011 010 699 A1 | 8/2012 |

*Primary Examiner* — Philip Gabler
(74) *Attorney, Agent, or Firm* — McGlew and Tuttle, P.C.

(57) ABSTRACT

A vehicle seat fitting includes a relatively rotatable first fitting part, with toothed ring, and second fitting parts, with guide segments. Catches are guided between locked and unlocked states by the guide segments and interact with the toothed ring to lock the fitting. A spring-loaded rotatable eccentric acts such that the catches interact with the toothed ring. A rotatably supported driver rotates the eccentric. An indicator is connected to the driver or to a fastening ring fastened to the driver. An adapter is connected to an operating lever and is supported on the driver or on the fastening ring. A sensor, fastened to the adapter, is connected to the fitting, detects a position change of the indicator and provides an electrical output signal. The adapter is returned to an initial position by a restoring spring regardless of the locking state of the fitting if the operating lever is not actuated.

20 Claims, 4 Drawing Sheets

(56) References Cited

U.S. PATENT DOCUMENTS

| | | | |
|---|---|---|---|
| 7,726,742 B2 * | 6/2010 | Keyser | B60N 2/0232 297/362 |
| 7,922,250 B2 * | 4/2011 | Rohee | B60N 2/20 297/367 L |
| 2009/0322137 A1 | 12/2009 | Kojima et al. | |
| 2012/0292972 A1 * | 11/2012 | Hofmann | B60N 2/20 297/354.12 |
| 2014/0210242 A1 * | 7/2014 | Schueler | B60N 2/123 297/362 |

* cited by examiner

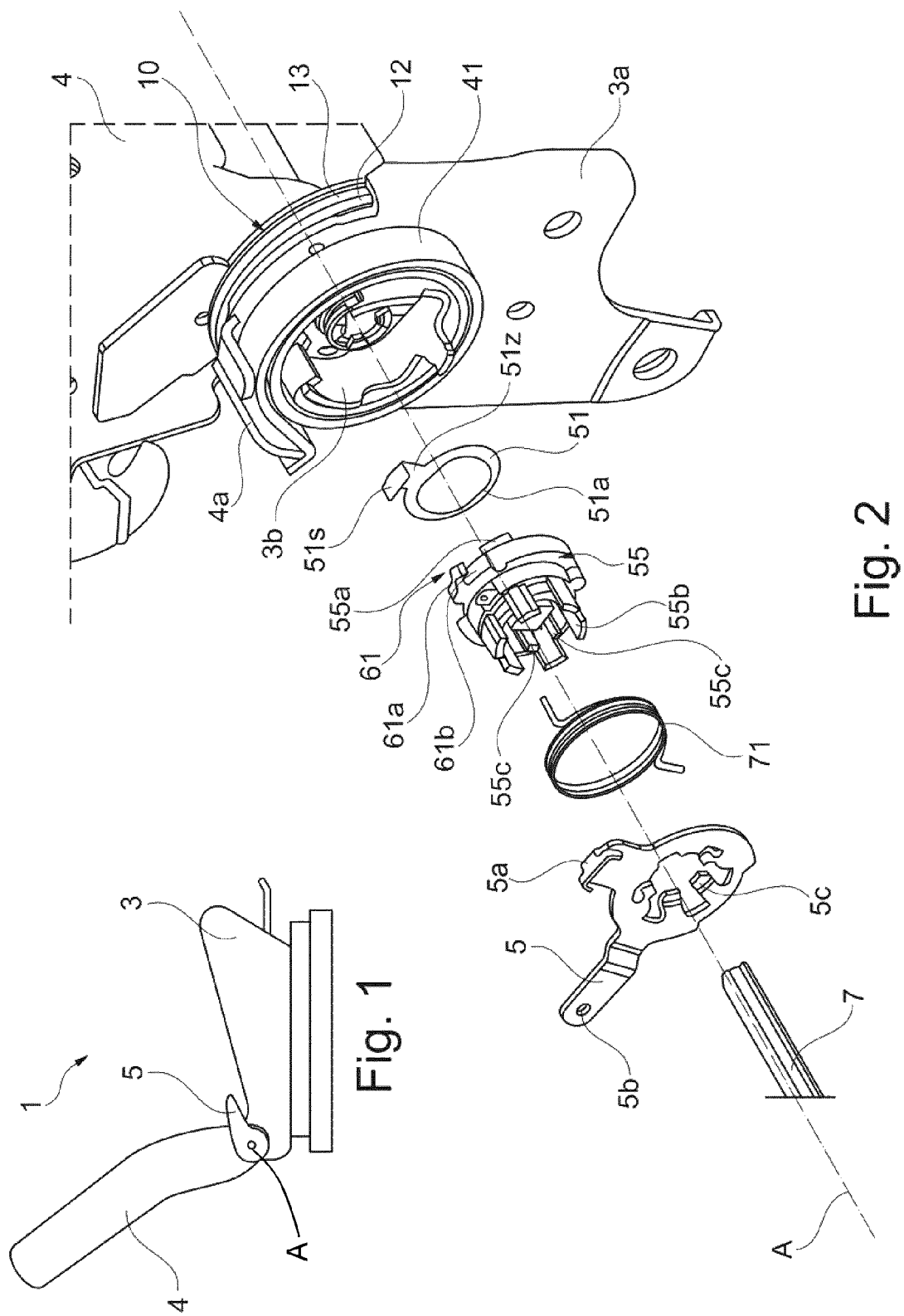

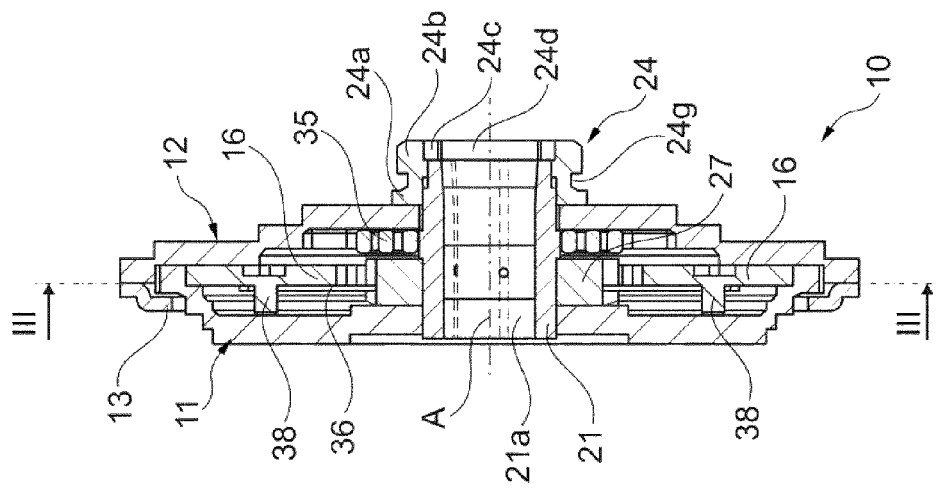
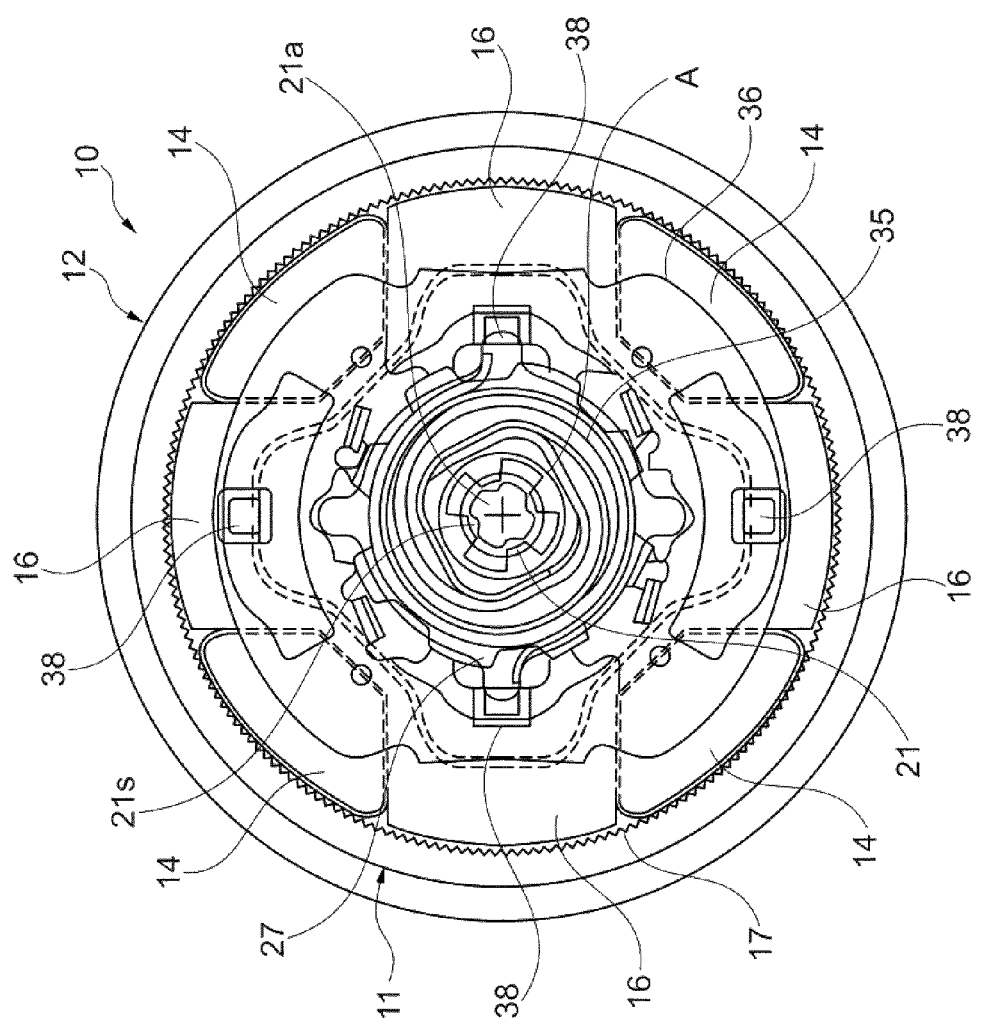

FITTING FOR A VEHICLE SEAT AND VEHICLE SEAT

CROSS REFERENCE TO RELATED APPLICATIONS

This application is a United States National Phase Application of International Application PCT/EP2013/060280 filed May 17, 2013 and claims the benefit of priority under 35 U.S.C. §119 of German Patent Application DE 10 2012 010 402.2 filed May 22, 2012, the entire contents of which are incorporated herein by reference.

FIELD OF THE INVENTION

The invention relates to a fitting for a vehicle seat having a first fitting part, with a toothed ring, a second fitting part, with guide segments, which are rotatable relative to one another about an axis, catches which are displaceable between a locked state and an unlocked state, and which, in the locked state, interact with the toothed ring in order to lock the fitting, a spring-loaded, rotatably mounted eccentric which acts on the catches in order to cause them to interact with the toothed ring, a rotatably mounted driver for rotating the eccentric, an indicator, which is connected rotationally conjointly to the driver or to a fastening ring which is fastened to the driver, and a sensor, which is connected to the fitting and by which a change in position of the indicator is detected and converted into an electrical output signal, and to a vehicle seat having the fitting.

BACKGROUND OF THE INVENTION

DE 10 2011 010 699 A1 discloses a generic fitting having an indicator. A radially projecting pointer of an indicator which is connected rotationally conjointly to a driver of the fitting displays the angular position of the driver and thus of the eccentric, which in turn is definitive of whether the catches that are acted on by the eccentric are radially at the outside or radially at the inside, that is to say whether the fitting is locked or unlocked. Owing to the internal construction of the fitting, the angular positions of the driver and thus the angular positions of the indicator differ only slightly between a locked state and an unlocked state of the fitting. In particular if the toothings of the toothed ring and of the catches are "tip to tip" and are thus not in locking, meshed engagement with one another, the change in angle of the pointer in relation to the locked state is visually barely perceptible. The pointer thus exhibits only limited suitability as an unlocked-state display of the fitting.

DE 10 2008 047 901 A1 discloses an electromotively actuated fitting, the locking state of which is detected by a sensor. The sensor is fastened to the fitting by means of a sensor clamp, and on the basis of the angular position of a cam, senses whether a blocking mechanism of the fitting has been moved to an unlocked position. It is a disadvantage that such a solution requires a sensor clamp, which takes up additional structural space and which entails additional costs and additional weight. Furthermore, a sensor arrangement of said type cannot be easily transferred to manually unlockable fittings.

A fitting for a vehicle seat without an indicator and without a sensor is disclosed by DE 10 2006 015 560 B3.

SUMMARY OF THE INVENTION

The invention is based on the problem of improving a fitting of the type mentioned in the introduction, in particular of providing a reliable and clear unlocked-state display for a manually actuable fitting, which is furthermore optimized in terms of cost and weight. The invention is also based on the problem of providing a vehicle seat having a fitting of said type.

By virtue of an adapter which is connected to an operating lever being rotatably mounted on the driver or on a fastening ring that is fastened to the driver, the adapter being returned into an initial position by means of a return spring when the operating lever is unactuated, regardless of the locking state of the fitting, and the sensor being fastened to the adapter, it is possible to dispense with an additional component for the fastening of the sensor in a region of the fitting, where only little structural space is available. In the unactuated state, the operating lever is always in its initial position, such that the sensor, which is coupled kinematically to the operating lever via the adapter, always correctly and reliably detects the locking state.

By virtue of the fact that, by means of the sensor which is connected to the fitting, a change in position of the indicator is detected and converted into an electrical output signal, it is possible for even small changes in the indicator position to be reliably detected and converted into an electrical or electronic signal.

The invention can be integrated particularly easily into fittings whose catches are pulled radially inward by a control disk, which is connected to the eccentric or to the driver, in order to unlock the fitting, whose eccentric is connected rotationally conjointly to the driver, and whose eccentric is rotated out of an initial angular position during the unlocking of the fitting and, in the unlocked state of the fitting, is secured, by at least one of the catches, so as to be prevented from pivoting fully back into the initial angular position. In the case of such fittings, the angular position of the driver is a unique function of the locking state of the fitting.

In the case of seats of a second seat row, access to the rear seat row can be facilitated by virtue of the backrest of the front seat being pivoted free, for which purpose the unlocked backrest is pivoted from one of the usage positions into a pivoted-free position in which the seat is not suitable for sitting on. Operating comfort is increased if the operating lever does not have to be held throughout the pivoting-free process. For this purpose, a pivoting-free control element, such as is known per se, may be provided in the fitting. The fitting can thus assume an unlocked state even when the actuating lever is unactuated.

By virtue of the fact that the driver is connected by means of a profiled connection to a transmission rod, and the driver can be driven by the transmission rod in an unlocking direction and, counter to the unlocking direction, a degree of play in the profiled connection permits limited angular mobility between the driver and the transmission rod, it is possible for the transmission rod and an operating lever that is operatively connected thereto to be rotated back into an initial position even when the driver cannot rotate back owing to an unlocked state of the fitting.

An adapter which is rotatably mounted on the driver or on a fastening ring fastened thereto, which adapter is returned into an initial position by means of a return spring when the operating lever is unactuated, regardless of the locking state of the fitting, is particularly suitable for the affixing of the sensor. Here, it is preferable for the adapter to be connected rotationally conjointly to the transmission rod and to the operating lever.

The adapter and operating lever may be formed in one piece. The operating lever is then part of the adapter, and the sensor is fastened thereby to the operating lever.

The indicator can be mounted in a simple manner on the driver, in particular on the fastening ring of the driver, if the indicator has a profile which can be pushed in an axial direction onto a profile of the driver or of the fastening ring of the driver, and thus formed into a rotationally conjoint connection between the indicator and the driver.

The indicator is preferably arranged axially between the fitting part and the adapter. At this location, the indicator is protected against damage.

Sensors which comprise a resilient and electrically conductive contact tongue and an electrically conductive contact surface are of simple construction and thus inexpensive. In the case of an unlocked fitting, a switching surface of the indicator presses the contact tongue against the contact surface, and thereby closes an electrical circuit.

The costs and the weight of the fitting can be further reduced if the sensor, or at least the contact tongue thereof, is integrated as an insert component into the adapter.

Microswitches are particularly suitable as sensors, because these are available in a wide variety of embodiments.

The change in position of the indicator as an input signal that is detected by the sensor is preferably a change in angle, though could also be a change in travel if use is made of intermediate gearings, which convert a rotational movement of the driver into a linear movement.

The signal conversion is preferably based on contact between sensor and indicator, though may also be implemented, with good results, using contactless, inductive, capacitive or ohmic means.

The output signal of the sensor, which is processed further by evaluation electrics or evaluation electronics, may be a current, a change in current, a voltage, a change in voltage or a combination of the above-mentioned variables. The unlocked state is advantageously displayed precisely when an electrical circuit is disrupted. With corresponding modification of the evaluation electrics/electronics, it may however also be provided that the unlocked state is displayed only when the electrical circuit is closed.

A vehicle seat having a fitting according to the invention is functionally reliable and is relatively lightweight and inexpensive.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a schematic side view of a vehicle seat;

FIG. 2 is a perspective side view of the exemplary embodiment, partially in an exploded illustration;

FIG. 3 is a section in a radial direction through a fitting along the line III-III in FIG. 4;

FIG. 4 is a section in an axial direction through the fitting;

DESCRIPTION OF THE PREFERRED EMBODIMENTS

Figure 5:
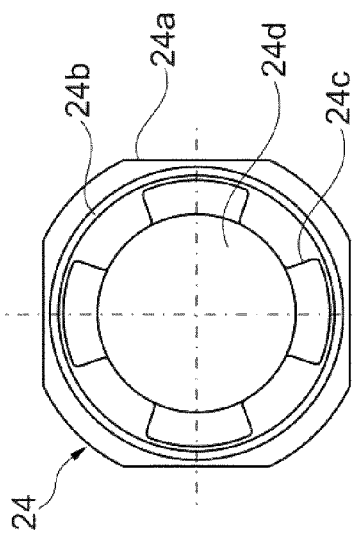
FIG. 5 is a detail view of the fastening ring.
Figure 7:
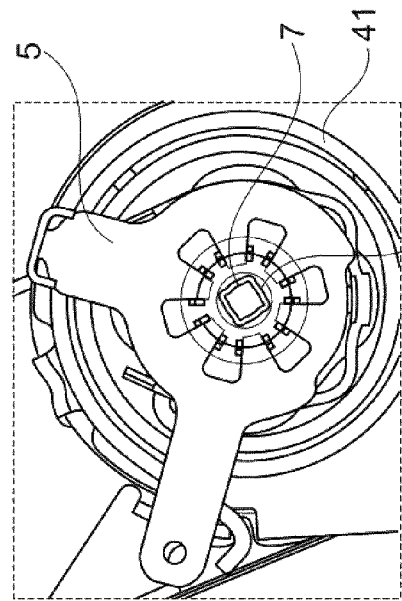
FIG. 7 is a view corresponding to FIG. 6, with adapter and operating lever, with the fitting in a locked state.
Figure 6:
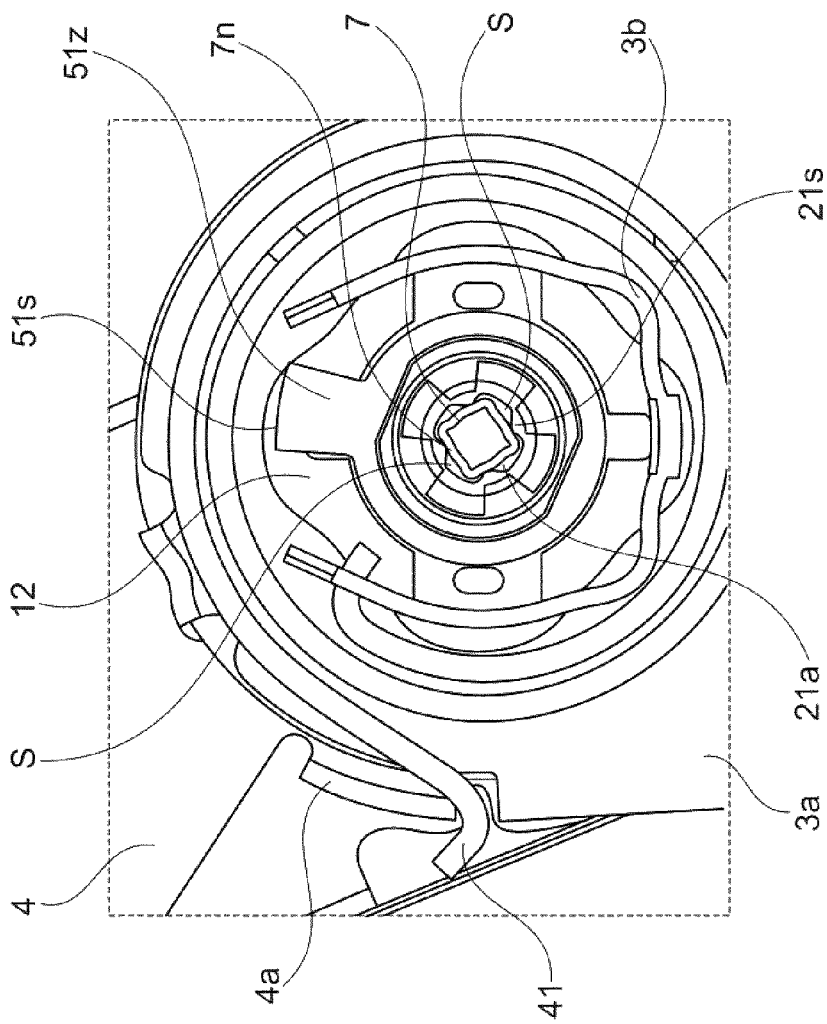
FIG. 6 is a side view of the vehicle seat in the region of the fitting, without adapter and operating lever, with the fitting in a locked state.

Referring to the drawings in particular, a vehicle seat 1 for a motor vehicle has a seat part 3 and a backrest 4 which is adjustable in terms of inclination relative to the seat part 3. For unlocking and inclination adjustment of the backrest 4, a transmission rod 7 which is arranged horizontally in the transition region between seat part 3 and backrest 4 is rotated manually, for example by means of an operating lever 5. On one of the two sides of the vehicle seat 1, the transmission rod 7 engages into a fitting 10. On the other side, the transmission rod 7 is mounted in a rotary bearing between seat part 3 and backrest 4. At both ends of the transmission rod 7, that is to say on both sides of the vehicle seat 1, there is provided in each case one operating lever 5. In the present case, a tension lug is affixed to a hook 5a of the operating lever 5. An attachment hole 5b permits the attachment of a first cable pull end for additional or alternative actuation of the fitting 5. The second cable pull end can be affixed to a further operating element, for example in the region of the backrest head. The operating lever 5 illustrated in FIGS. 1, 2 and 7 is actuated counterclockwise for the unlocking of the fitting 10.

In a modification of the exemplary embodiment, only precisely one operating lever 5 is provided, wherein said operating lever acts either on the end assigned to the fitting 10, or the end assigned to the rotary bearing, of the transmission rod 7.

The fitting 10 has a first fitting part 11 and a second fitting part 12 which are rotatable relative to one another about an axis A. The (imaginary) axis A is in the present case in alignment with the axis of the transmission rod 7 and defines the directional terms, used here, of a cylindrical coordinate system. The two fitting parts 11 and 12 each approximately describe a circular disk shape. The two fitting parts 11 and 12 are preferably composed of metal, in particular steel, which may be hardened at least in regions. For absorbing the axially acting forces, that is to say for holding the fitting parts 11 and 12 together axially, a clasp ring 13 is provided. The clasp ring 13 is preferably composed of metal, in particular steel, which is preferably non-hardened. The clasp ring 13 preferably has a substantially flat ring shape, though may also, in an alternative embodiment, have an L-shaped profile with a cylindrical section and, at an end side, a flat ring section.

The clasp ring 13 is fixedly connected to one of the two fitting parts 11 and 12, in the present case, in an outer ring section, to the second fitting part 12, for example by means of laser welding or by means of some other fastening technique which is known per se. By means of an inner ring section which is arranged in a plane perpendicular to the axial direction, the clasp ring 13 engages over the first fitting part 11 in the radially outer edge region thereof, if appropriate with the interposition of a slide ring, without hindering the relative movement of the two fitting parts 11 and 12. Furthermore, the inner surfaces, which face toward one another, of the two fitting parts 11 and 12 are protected against the ingress of foreign bodies and dirt and against damage.

The clasp ring 13 and the fitting part 11 or 12 fixedly connected thereto thus clasp the other of the two fitting parts 11 and 12, which is movable relative to the clasp ring and the former fitting part. In structural terms, the two fitting parts 11 and 12 thus together (with the clasp ring 13) form a disk-shaped unit.

With the mounting of the fitting 10, the first fitting part 11 is for example fixedly connected to the structure of the backrest 4, that is to say is fixed with respect to the backrest. The second fitting part 12 is fixedly connected to a seat part adapter 3a, which is fixedly screwed to the structure of the seat part 3. The second fitting part 12 is thus fixed with respect to the seat part. The assignments of the fitting parts 11 and 12 may however be interchanged, that is to say the first fitting part 11 would then be fixed with respect to the seat part, and the second fitting part 12 would be fixed with respect to the backrest. The fitting 10 lies in the force flow between backrest 4 and seat part 3.

The fitting 10 is in the form of a latching fitting in which the first fitting part 11 and the second fitting part 12 can be locked to one another, as is described for example in DE 10 2006 015 560 B3, the content of disclosure of which in this regard is expressly incorporated here.

The second fitting part 12 has guide segments 14—of which there are four in the present case—which, by way of paired straight guide surfaces, guide in each case one catch 16 laterally in the radial direction. The catches 16—of which there are a total of four in the present case—are arranged offset with respect to one another—in the present case by 90° in each case—in a structural space defined between the two fitting parts 11 and 12. The catches 16 are provided, on their radially outer ends, with a toothing which can engage (mesh) with a toothed ring 17 of the first fitting part 11 which is in the form of an internal gear. When the toothed ring 17 and the catches 16 interact, the fitting 10 is locked.

The first fitting part 11 is arranged in a depression of the second fitting part 12 and is engaged over radially at the outside by the latter, whereby the two fitting parts 11 and 12 bear one another. Here, the radially outer edge region of the first fitting part 11 is arranged with the toothed ring 17 in the radial direction between the guide segments 14 and the radially outer edge region (which serves for bearing the first fitting part 11) of the second fitting part 12. Under high loads, for example in the event of a crash, the first fitting part 11 can—after a deformation—abut by way of its toothed ring 17 against those guide segments 14 which are situated closest in the direction of load, said guide segments having correspondingly (concentrically) curved surfaces in the direction of the toothed ring 17. This increases the strength of the fitting 10.

Arranged in the center of the fitting 10 is a driver 21, composed for example of plastic, which is mounted rotatably on at least one of the two fitting parts 11 and 12, in the present case on the first fitting part 11, more specifically in a central opening thereof. The driver 21 has, in the axial direction, a profiled hole 21a designed for interacting with the transmission rod 7. The cylindrical basic shape of the profiled hole 21a is interrupted by four radially inwardly pointing webs 21s which are oriented in the axial direction and which are distributed uniformly over the circumference of the profiled hole 21a. The transmission rod 7 has a counterpart profile with four grooves 7n distributed uniformly over the circumference of the transmission rod 7. Each of the four webs 21s bears in the circumferential direction and in the actuating direction of the operating lever 5, that is to say in the unlocking direction of the fitting 10, against a respective groove 7n. A rotational movement of the transmission rod 7 is thus transmitted to the driver 21. For the purposes of tolerance compensation and in order to allow the actuating lever 5 to rotate back into its initial position even when the fitting is unlocked, a degree of play S is provided between the grooves 7n and the webs 21s, counter to the actuating direction of the operating lever 5, in the profiled connection. For this purpose, the webs 21s have a smaller width in the circumferential direction than the grooves 7n do.

On one end of the driver 21, in the present case on that end which is arranged in the region of the second fitting part 12, there is provided a fastening ring 24, which in the present case is composed of plastic and which is preferably fastened to the driver 21 by ultrasound welding.

Seated rotationally conjointly on the driver 21 is an eccentric 27 which is arranged in the structural space defined between the fitting parts 11 and 12. A spring arrangement 35, for example one or two spiral springs nested one inside the other, is arranged in a central receptacle of one of the two fitting parts 11 and 12, in the present case of the second fitting part 12, and in the present case is externally supported. The spring arrangement 35 exerts load on the eccentric 27, in the present case by virtue of said spring arrangement being seated rotationally conjointly on the driver 21 at the inside. A spring arrangement 35 of said type is described for example in DE 10 2005 046 807 B3, the content of disclosure of which in this regard is expressly incorporated here. The eccentric 27 which is subjected to load by the spring arrangement 35 acts on the radially movable catches 16, and exerts load on these such that they are pushed radially outward in order to mesh with the toothed ring 17, thus locking the fitting 10.

A control disk 36 is arranged, in the structural space defined between the fitting parts 11 and 12, axially between the catches 16 and the first fitting part 11, and in the present case is seated rotationally conjointly on the eccentric 27. The control disk 36 has control tracks—of which there are four in the present case—which interact in each case with a lug 38 of each catch 16. In this case, the lugs 38 project in the axial direction from the catches 16 associated therewith. In the event of a rotation (by a few degrees) of the driver 21—and of the eccentric 27 driven by said driver, and of the control disk 36—counter to the force of the spring arrangement 35, the control disk 36 pulls the catches 16 radially inward, that is to say out of the toothed ring 17, whereby the fitting 10 is unlocked and the two fitting parts 11 and 12 are rotatable relative to one another about the axis A. The backrest 4 is now pivotable about the axis A in order to be adjusted in terms of its inclination, that is to say in order to assume a different usage position.

In the unlocked state of the fitting 10, the radially inwardly pulled catches 16 prevent a backward rotation of the eccentric 27 by virtue of at least one radially outwardly projecting cam of the eccentric 27 abutting against at least one of the catches 16. The driver 21 that is connected rotationally conjointly to the eccentric 27 thus also cannot rotate back into its initial position.

In the case of two-door motor vehicles, or in the case of seats of a second row of seats, access to a rear seat row can be facilitated by pivoting the backrest 4 free, for which purpose the unlocked backrest 4 is pivoted from one of the usage positions forward into a pivoted-free position in which the seat is not suitable for sitting on. Operating comfort is increased if the operating lever 5—or a further actuating element connected thereto by way of the attachment hole 5b—does not have to be held throughout the entire pivoting-free process, and the fittings nevertheless lock only in the pivoted-free position. For this purpose, it is optionally possible for an annular pivoting-free control element, such as is described for example in DE 10 2006 015 560 B3, the content of disclosure of which in this regard is expressly incorporated here, to be provided between the control disk 36 and the first fitting part 11 around the axis A.

The fitting 10, the transmission rod 7 and the operating lever 5 are parts of a fitting system, which preferably also includes a spiral-shaped backrest compensation spring 41, which is arranged in the region of the fitting 10. A first, radially outer spring end of the backrest compensation spring 41 is supported on a support lug 4a of the backrest 4. A second, radially inner spring end of the backrest compensation spring 41 is supported on a spring adapter 3b attached to the seat part 3. The backrest compensation spring 41 compensates the gravitational load of the backrest 4, which in the usage position is inclined rearward in relation to the vertical, and of the occupant leaning against the backrest 4.

The transmission rod 7 is arranged between the fitting 10 on the first side of the vehicle seat and the rotary bearing (not illustrated in the figures) on the second side of the vehicle seat. In a modification of the exemplary embodiment, the rotary bearing is replaced by a second fitting 10. The transmission rod 7 is then arranged between the two fittings 10 and engages into these at both sides.

The fastening ring 24 of the fitting 10 has multiple different functional regions, of which there are four in the present case. Directly axially adjacent to the second fitting part 12, the fastening ring 24 has an external profile 24a, in the present case a square with rounded corners, which is formed in an encircling manner on a radially projecting material section. On the free end facing away from the second fitting part 12, the fastening ring 24 has a collar 24b which likewise projects radially. Radially within the collar 24b there is formed an internal profile 24c, for example an encircling undulation or a spline profile. The internal profile 24c is an interface for possible further attachment parts, but in the present case is without function. Radially at the inside, the hollow fastening ring 24 is provided with a passage 24d, into which the driver 21 is partially inserted and through which the transmission rod 7, which is surrounded by the driver 21, runs in a relatively movable manner.

The external profile 24a is provided so as to interact rotationally conjointly, on the first side of the vehicle seat, with an indicator 51 which acts as a signal transducer. The indicator 51 is a ring with a radially projecting pointer 51z, on the radially outer end of which a switching surface 51s is bent in the axial direction. The ring of the indicator 51 has, on its inner side, a profile 51a which fits, and preferably interacts in positively locking fashion, with the external profile 24a. The indicator 51 indicates the angular position of the driver 21 and thus of the eccentric 27, which in turn is a measure of whether the catches 16 which are subjected to load by the eccentric 27 are radially at the outside or radially at the inside, that is to say whether the fitting 10 is locked or unlocked.

A channel 24g is formed on the fastening ring 24 axially between the external profile 24a and the collar 24b, which channel is for example 1 mm deep in relation to the collar 24b. The collar 24b is a constituent part of an axially acting clip connection between the fastening ring 24 and a further component to be clipped on. Owing to the channel 24g, the collar 24b can be engaged behind in order to produce the clip connection. The component to be clipped on, which has geometries for interacting with the collar 24b, is in the present case an adapter 55 which is formed preferably from plastic. The adapter 55 has an annular basic geometry with a central opening 55d through which the transmission rod 7 is guided in axially movable fashion but so as to be rotationally conjointly connected to the adapter 55. For this purpose, the central opening 55d has a profiled shape with four profile webs 55s, which profiled shape forms a connection to the profile of the transmission rod 7 for conjoint rotation in both directions of rotation. The adapter 55 additionally has geometries for fixed connection to the operating lever 5 and for axially securing the fastening ring 24 to the fitting 10.

Multiple first clip hooks 55a, which are oriented in the axial direction toward the fitting 10, of the adapter 55 each have a radially inwardly pointing hook lug, and engage by way of said hook lugs behind the collar 24b of the fastening ring 24 and fasten the adapter 55 to the fastening ring 24 in the axial direction. In this way, the adapter 55 is mounted on the fastening ring 24 in a rotatable but axially secured manner.

The adapter 55 is rotationally conjointly connected, on its side facing away from the fitting 10, to the operating lever 5. For this purpose, the adapter 55 has, over the circumference, six centering arms 55b which point away from the fitting 10 in the axial direction. Furthermore, in the intermediate spaces between the individual centering arms 55b, six second clip hooks 55c which are offset radially inward slightly in relation to the centering arms 55b are provided. Provided on the operating lever 5 in the axial direction are six clip arms 5c which engage in each case into the intermediate spaces between two centering arms 55b and which clip together with the clip hooks 55c. Alternatively, the operating lever 5 and the adapter 55 may be formed in one piece with one another.

A return spring 71 which acts between the adapter 55 and the spring adapter 3b of the seat part adapter 3a exerts a torque on the adapter 55, which torque preloads the adapter 55, and the operating lever 5 fastened thereto, in the direction of its unactuated initial position. As a result, and owing to the play S in the profiled connection between the transmission rod 7 and the driver 21, the adapter 55, and the actuating lever 5 fastened thereto, rotates back into its initial position when it is not actuated by the user.

On its outer circumferential surface, the adapter 55 has a sensor 61 by means of which a change in position of the indicator 51 is detected and converted into an electrical output signal. In the present case, the sensor 61 is composed of an electrically conductive contact tongue 61a, which is resiliently connected to the adapter 55, and of an electrically conductive contact surface 61b, which is in particular fixedly connected to the adapter 55, said contact tongue and contact surface being part of an electrical circuit. When the contact tongue 61a bears against the contact surface 61b, the electrical circuit is closed. For this purpose, the contact tongue 61a and the contact tongue 61b are in each case connected—in particular via an insulated electrical cable—to an electrical plug connection (not illustrated in the figures) such as is generally known. The plug connection couples the sensor 61 to an electromechanical display element, provided on the vehicle seat, of an unlocked-state display or to the vehicle electrics or electronics, which in turn evaluates a disruption in the electrical circuit and activates an unlocked-state display, for example in the dashboard.

The indicator 51 is arranged axially between the second fitting part 12 at one side and the adapter 55 and the operating lever 5 at the other side. The switching surface 51s of the indicator 51 interacts with the contact tongue 61a of the sensor 61. If the switching surface 51s is situated in the region of the contact tongue 61a, the switching surface 51s presses the contact tongue 61a radially inward against the contact surface 61b, and closes the current circuit. When the switching surface 51s moves away from the contact tongue 61a, the contact tongue 61a deflects radially outward and moves away from the contact surface 61b. The electrical circuit is then disrupted.

Figure 8:
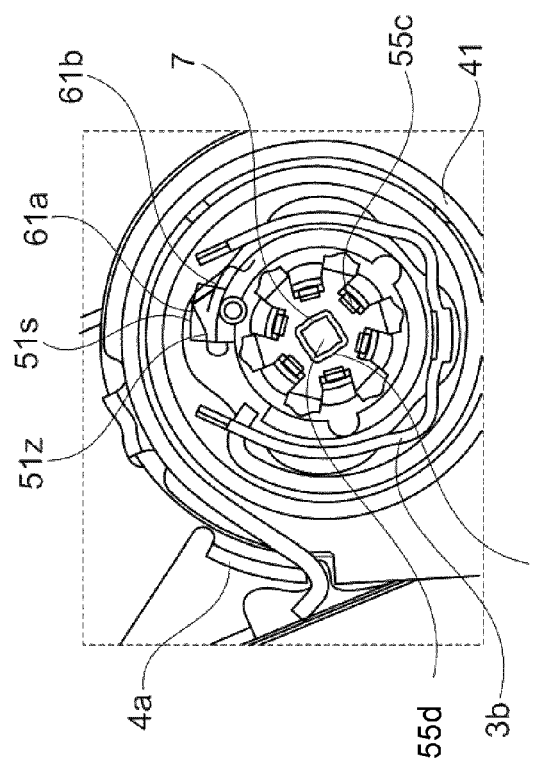
FIG. 8 is a view corresponding to FIG. 6, with adapter and without operating lever, with the fitting in a locked state.

The angular position of the pointer 51z of the indicator 51, and thus of the switching surface 51s, relative to the second fitting part 12 which is fixed with respect to the seat part is dependent on the locking state of the fitting 10. In an initial position illustrated in FIG. 8, the fitting 10 is in the locked state. The switching surface 51s is situated above the sensor 61 in the radial direction and presses the contact tongue 61a against the contact surface 61b. The electrical circuit is closed.

Figure 9:
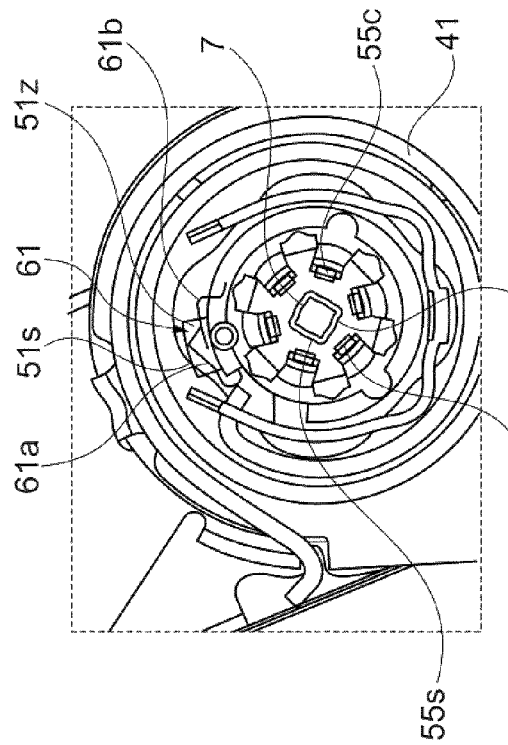
FIG. 9 is a view corresponding to FIG. 8 during the unlocking of the fitting.

FIG. 9 shows the actuated operating lever 5 which, by means of the adapter 55 connected rotationally conjointly thereto, has been deflected out of the initial position and thus rotates the fastening ring 24 and consequently the driver 21. As a result, the fitting 10 is unlocked, such that the backrest 4 can be pivoted. The rotation of the adapter 55 effects a rotation of the sensor 61 fastened thereto and also of the indicator 51. Furthermore, the switching surface 51s actuates the sensor 61 by virtue of the contact tongue being pressed against the contact surface 61b. The electrical circuit remains closed.

If the deflected operating lever 5 is released, the spring arrangement 35 contained in the fitting 10 rotates the eccentric 27 together with driver 21 back in order thereby to exert load on the catch 16 in order that the fitting 10 passes into the locked state. The driver 21 rotates its fastening ring 24 and thus the indicator 51 backward. Furthermore, said fastening ring 24 rotates the adapter 55, whereby the deflected operating lever 5 returns to the initial position. Furthermore, the switching surface 51s continues to actuate the sensor 61 by virtue of the contact tongue being pressed against the contact surface 61b. The electrical circuit remains closed.

Figure 10:
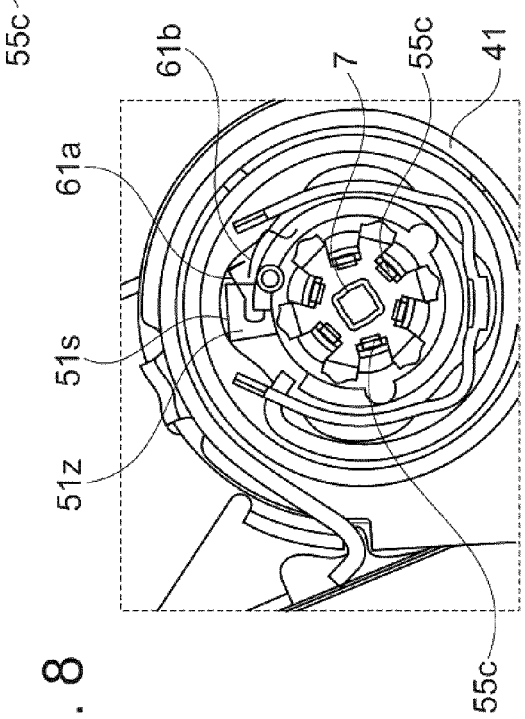
FIG. 10 is a view corresponding to FIG. 8 with the fitting in an unlocked state ("tip to tip position") and the unlocking lever in an unactuated state.

If the fitting 10—as illustrated in FIG. 10—is not locked, for example because the catch 16 and the toothed ring 17 are in a "tooth on tooth" position, then the radially inwardly pulled catches 16 prevent the eccentric 27, and the driver 21 connected rotationally conjointly thereto, from rotating backward. The indicator 51 which is connected to the fastening ring 24 of the driver 21 thus does not rotate backward or does not rotate backward fully, whereas the adapter 55 together with the sensor 61 is pivoted back fully by the restoring spring 71 and the play S. The switching surface 51s thus moves away from the contact tongue 61a, which moves with spring action away from the contact surface 61b such that the electrical circuit is disrupted and, in the manner described above, an unlocked-state display is activated. The user thus identifies that the initial position has not yet been reached, that is to say the fitting 10 is not yet in the locked state, and handling is still required in order to realize correct locking. The "tooth on tooth" position can be eliminated by means of a minimal pivoting movement (approximately 1°) of the backrest 4.

In a modification of the exemplary embodiment, the backrest 4 is articulatedly connected to the seat part 3 on both sides of the vehicle seat 1 by means of in each case one fitting 10. In this case, the second fitting 10 may also have corresponding means, comprising indicator 51 and sensor 61, for sensing the unlocked state. The electrical signals of the two sensing means are then evaluated by means of evaluation electrics or electronics. If an OR combination is used, the unlocked state of the backrest 4 is displayed for example if one of the two fittings 10 is not locked.

In a further modification of the exemplary embodiment, the adapter 55 is formed with the additional functions of an abutment module, as is known for example from DE 10 2010 025 112 A1. For this purpose, the central opening 55d of the adapter 55 has a profiled shape which forms a rotationally conjoint connection to the profile of the transmission rod 7. In this way, the adapter 55 is operatively connected to the operating lever 5 on one side and to the transmission rod 7 on the other side. In at least one direction of rotation of the hand lever 5, the latter abuts against one of the fitting parts 11 or 12 by virtue of abutment geometries of the adapter 55 interacting with abutment geometries of one of the fitting parts 11 or 12.

As a result, the internal components of the fitting are protected against misuse forces.

In the above exemplary embodiments, a signal is output, owing to the disrupted electrical circuit, whenever the fitting 10 is unlocked and the actuating lever 5 is unactuated. In a further modification of the exemplary embodiments, however, it is also possible for the signal to be output whenever the fitting 10 is unlocked, regardless of the angular position of the operating lever 5. For this purpose, an idle travel must be provided in the circumferential direction between the operating lever 5 and adapter 55 and/or between adapter 55 and fastening ring 24.

The features disclosed in the above description, in the claims and in the drawings may be of importance both individually and also in combination for the realization of the invention in its various embodiments.

While specific embodiments of the invention have been shown and described in detail to illustrate the application of the principles of the invention, it will be understood that the invention may be embodied otherwise without departing from such principles.

The invention claimed is:

1. A fitting for a motor vehicle seat, the fitting comprising:
a first fitting part with a toothed ring formed on the first fitting part;
a second fitting part with guide segments formed on the second fitting part, the first fitting part and the second fitting part being rotatable relative to one another about an axis;
catches guided by means of the guide segments, the catches being displaceable between a locked state and an unlocked state, in the locked state the catches interacting with the toothed ring in order to lock the fitting;
a spring-loaded, rotatably mounted eccentric acting on the catches in order to cause the catches to interact with the toothed ring;
a rotatably mounted driver for rotating the eccentric;
an indicator connected rotationally conjointly to the driver or to a fastening ring fastened to the driver; and
a sensor connected to the fitting, the sensor detecting a change in position of the indicator and converting the detected change in position into an electrical output signal;
an operating lever;
a return spring; and
an adapter connected to the operating lever and mounted rotatably on the driver or on the fastening ring that is fastened to the driver, the adapter being returned into an initial position by means of the return spring when the operating lever is unactuated, regardless of a locking state of the fitting, and the sensor being fastened to the adapter.

2. A fitting as claimed in claim 1, further comprising a control disk connected to the eccentric or to the driver, wherein the catches are pulled radially inward by the control disk to unlock the fitting.

3. A fitting as claimed in claim 2, further comprising a pivoting-free control element wherein the pivoting-free control element, in a certain pivoting-free angle range, which corresponds to a relative angle range of the fitting parts, prevents the fitting from locking.

4. A fitting as claimed in claim 1, wherein the eccentric is connected rotationally conjointly to the driver.

5. A fitting as claimed in claim 1, wherein:
the indicator has a profile; and
the driver or the fastening ring has an external profile for rotationally conjoint interaction with a profile of the indicator.

6. A fitting as claimed in claim 1, further comprising a transmission rod, wherein:
the driver is connected by means of a profiled connection to the transmission rod;
the driver can be driven by the transmission rod in an unlocking direction and, counter to the unlocking direction, a degree of play in the profiled connection permits limited angular mobility between the driver and the transmission rod; and
the adapter is connected to the transmission rod for conjoint rotation in both directions.

7. A fitting as claimed in claim 6, wherein the transmission rod has at least one groove which interacts with at least one web of the driver, and the play is provided between the at least one groove and the at least one web.

8. A fitting as claimed in claim 1, wherein the adapter comprises multiple clip hooks which engage behind a collar of the fastening ring, whereby the adapter is mounted fixedly in the axial direction and rotatably in the circumferential direction on the fastening ring.

9. A fitting as claimed in claim 1, wherein the indicator is arranged axially between the second fitting part at one side and the adapter at another side.

10. A fitting as claimed in claim 1, wherein, in at least one direction of rotation of the operating lever, at least one abutment geometry of the adapter interacts with at least one abutment geometry of one of the fitting parts, and thereby limits an angle of rotation.

11. A fitting as claimed in claim 10, wherein with the fitting locked, a switching surface of the indicator presses the contact tongue against the contact surface and thereby closes an electrical circuit.

12. A fitting as claimed in claim 1, wherein the sensor comprises a resilient and electrically conductive contact tongue and an electrically conductive contact surface.

13. A fitting as claimed in claim 12, wherein the contact tongue is integrated, as an insert solution, into the adapter.

14. A fitting as claimed in claim 13, wherein the sensor is integrated entirely as an insert solution into the adapter.

15. A motor vehicle seat comprising:
a motor vehicle seat fitting comprising:
a first fitting part with a toothed ring formed on the first fitting part;
a second fitting part with guide segments formed on the second fitting part, the first fitting part and the second fitting part being rotatable relative to one another about an axis;
catches guided by means of the guide segments, the catches being displaceable between a locked state and an unlocked state, in the locked state the catches interacting with the toothed ring in order to lock the fitting;
a spring-loaded, rotatably mounted eccentric acting on the catches in order to cause the catches to interact with the toothed ring;
a rotatably mounted driver for rotating the eccentric;
an indicator connected rotationally conjointly to the driver or to a fastening ring fastened to the driver; and
a sensor connected to the fitting, the sensor detecting a change in position of the indicator and converting the detected change in position into a sensor electrical output signal;
an operating lever;
a return spring; and
an adapter connected to the operating lever and mounted rotatably on the driver or on the fastening ring that is fastened to the driver, the adapter being returned into an initial position by means of the return spring when the operating lever is unactuated, regardless of a locking state of the fitting, and the sensor being fastened to the adapter; and
an unlocked-state display having a display state that is switched by the sensor electrical output signal.

16. A motor vehicle seat as claimed in claim 15, further comprising a control disk connected to the eccentric or to the driver, wherein the catches are pulled radially inward by the control disk to unlock the fitting.

17. A motor vehicle seat as claimed in claim 16, further comprising a pivoting-free control element wherein the pivoting-free control element, in a certain pivoting-free angle range, which corresponds to a relative angle range of the fitting parts, prevents the fitting from locking, wherein the eccentric is connected rotationally conjointly to the driver.

18. A motor vehicle seat as claimed in claim 15, wherein:
the indicator has a profile; and
the driver or the fastening ring has an external profile for rotationally conjoint interaction with a profile of the indicator.

19. A motor vehicle seat as claimed in claim 15, further comprising a transmission rod, wherein:
the driver is connected by means of a profiled connection to the transmission rod;
the driver can be driven by the transmission rod in an unlocking direction and, counter to the unlocking direction, a degree of play in the profiled connection permits limited angular mobility between the driver and the transmission rod;
the adapter is connected to the transmission rod for conjoint rotation in both directions; and
the transmission rod has at least one groove which interacts with at least one web of the driver, and the play is provided between the at least one groove and the at least one web.

20. A motor vehicle seat as claimed in claim 15, wherein the adapter comprises multiple clip hooks which engage behind a collar of the fastening ring, whereby the adapter is mounted fixedly in the axial direction and rotatably in the circumferential direction on the fastening ring.

* * * * *